(12) United States Patent
Itadani et al.

(10) Patent No.: US 10,344,867 B2
(45) Date of Patent: Jul. 9, 2019

(54) SLIDING COMPONENT

(71) Applicant: EAGLE INDUSTRY CO., LTD., Minato-ku, Tokyo (JP)

(72) Inventors: Masatoshi Itadani, Tokyo (JP); Kazumasa Sungawa, Tokyo (JP); Yuichiro Tokunaga, Tokyo (JP); Hideyuki Inoue, Tokyo (JP); Takeshi Hosoe, Tokyo (JP); Ryoma Yamakawa, Tokyo (JP); Yuta Negishi, Tokyo (JP); Kenji Kiryu, Tokyo (JP); Keiichi Chiba, Tokyo (JP); Akira Yoshino, Tokyo (JP); Hiroshi Kubota, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 12 days.

(21) Appl. No.: 15/505,571

(22) PCT Filed: Aug. 26, 2015

(86) PCT No.: PCT/JP2015/073988
§ 371 (c)(1),
(2) Date: Feb. 21, 2017

(87) PCT Pub. No.: WO2016/042995
PCT Pub. Date: Mar. 24, 2016

(65) Prior Publication Data
US 2018/0106374 A1    Apr. 19, 2018

(30) Foreign Application Priority Data

Sep. 20, 2014    (JP) .................................. 2014-192047

(51) Int. Cl.
*F16J 15/34*       (2006.01)
*F04D 29/12*       (2006.01)

(52) U.S. Cl.
CPC .......... *F16J 15/342* (2013.01); *F04D 29/128* (2013.01); *F16J 15/34* (2013.01); *F16J 15/3412* (2013.01); *F16J 15/3448* (2013.01)

(58) Field of Classification Search
CPC .. F04D 29/128; F16J 15/3448; F16J 15/3412; F16J 15/162; F16J 15/3432
See application file for complete search history.

(56) References Cited

U.S. PATENT DOCUMENTS

| 3,147,013 A | 9/1964 | Tracy |
| 3,804,424 A * | 4/1974 | Gardner ............... F16J 15/3412 277/360 |

(Continued)

FOREIGN PATENT DOCUMENTS

| CN | 103133696 A | 6/2013 |
| CN | 103765060 A | 4/2014 |

(Continued)

OTHER PUBLICATIONS

International Search Report (ISR) dated Oct. 6, 2015, issued for International application No. PCT/JP2015/073945.

(Continued)

*Primary Examiner* — Eugene G Byrd
(74) *Attorney, Agent, or Firm* — Law Office of Katsuhiro Arai

(57) ABSTRACT

In an embodiments, a slide component includes a pair of slide parts that relatively slide on each other, one of the slide parts being provided in a sealing face with fluid circulation grooves 10 that communicate with a high-pressure fluid side via inlet portions and outlet portions and are separated from a low-pressure fluid side by land portions, the other of the slide parts being circumferentially provided in a sealing face with a plurality of interference grooves 15, 16, 17, 20 for producing pressure variations in a fluid in the fluid circula- (Continued)

tion grooves 10, adjacent ones of the interference grooves 15, 16, 17, 20 being set to have different shapes.

8 Claims, 4 Drawing Sheets

(56) References Cited

U.S. PATENT DOCUMENTS

| | | | |
|---|---|---|---|
| 5,090,712 A * | 2/1992 | Pecht | F16J 15/3412 |
| | | | 277/400 |
| 5,498,007 A | 3/1996 | Kulkarni et al. | |
| 9,863,473 B2 * | 1/2018 | Hosoe | F16C 33/741 |
| 9,951,873 B2 * | 4/2018 | Inoue | F16J 15/342 |
| 9,964,215 B2 * | 5/2018 | Itadani | F16J 15/3412 |
| 2004/0232622 A1 * | 11/2004 | Gozdawa | F16J 15/342 |
| | | | 277/401 |
| 2005/0212217 A1 * | 9/2005 | Tejima | F16J 15/3412 |
| | | | 277/399 |
| 2012/0217705 A1 * | 8/2012 | Hosoe | F16J 15/3412 |
| | | | 277/400 |
| 2013/0209011 A1 * | 8/2013 | Tokunaga | F16C 17/045 |
| | | | 384/123 |
| 2014/0197600 A1 * | 7/2014 | Hosoe | F16J 15/3412 |
| | | | 277/409 |
| 2016/0252182 A1 * | 9/2016 | Itadani | F16J 15/3412 |
| | | | 277/401 |

FOREIGN PATENT DOCUMENTS

| | | | | |
|---|---|---|---|---|
| CN | 103791097 A | | 5/2014 | |
| JP | 59110959 A | * | 6/1984 | ........... F16J 15/3412 |
| JP | S59110959 A | | 6/1984 | |
| JP | 1985167861 U1 | | 11/1985 | |
| JP | H7180772 A | | 7/1995 | |
| JP | H7224948 A | | 8/1995 | |
| WO | WO-2014112455 A1 | * | 7/2014 | ........... F16J 15/3412 |

OTHER PUBLICATIONS

A First Office Action issued by the State Intellectual Property Office of China dated Sep. 1, 2017 for Chinese counterpart application No. 201580036195.8.

* cited by examiner (a)

SECTION A-A
(b)

SECTION B-B
(c)

SLIDING COMPONENT

This application is the U.S. National Phase under 35 U.S.C. § 371 of International Application PCT/JP2015/073988, filed Aug. 26, 2015, which claims priority to Japanese Patent Application No. 2014-192047, filed Sep. 20, 2014. The International Application was published under PCT Article 21(2) in a language other than English.

TECHNICAL FIELD

The present invention relates to slide components suitable for, for example, mechanical seals, bearings, and other slide portions, and in particular, relates to slide components such as seal rings or bearings that require friction reduction by interposing a fluid between sealing faces as well as prevention of fluid leakage from the sealing faces.

BACKGROUND ART

A mechanical seal, an example of a slide component, is evaluated for its performance by a leakage rate, a wear rate, and torque. In conventional arts, by optimizing the seal material and the sealing face roughness of a mechanical seal, performance is increased, and low leakage, long life, and low torque are achieved. However, due to growing awareness of environmental problems in recent years, a further improvement in the performance of mechanical seals has been demanded, for which technology development beyond the limits of the conventional arts has been required.

In that context, the inventors have confirmed that in a mechanical seal in a water pump used for cooling a water-cooled engine, for example, an additive in LLC, a type of antifreeze, such as silicate or phosphate (hereinafter, referred to as a "deposit formation-causing substance") can be concentrated on a sealing face, forming a deposit as time passes, and degrading the function of the mechanical seal. The deposit formation is considered as a phenomenon that occurs likewise in mechanical seals in apparatuses that handle chemicals or oils.

There is a known conventional mechanical seal in which a sealing face is formed with grooves to form a fluid layer in order to prevent occurrence of wear or burn damage of sealing faces due to frictional heat generation (see Patent Documents 1, 2, and 3, for example). However, these inventions only introduce a fluid into a sealing face, and do not take measures to prevent formation of deposits on a sealing face.

CITATION LIST

Patent Document

Patent Document 1: JP H7-180772 A
Patent Document 2: JP H7-224948 A
Patent Document 3: U.S. Pat. No. 5,498,007

SUMMARY OF THE INVENTION

Problem to be Solved by the Invention

The present invention has an object of providing a slide component that can prevent deposit formation on a sealing face as well as promoting circulation of a fluid on sealing faces while fulfilling both conflicting conditions of sealing and lubrication, to maintain the sealing function of the sealing faces for a long period of time.

Means for Solving Problem

To attain the above object, a slide component according to a first aspect of the present invention includes a pair of slide parts that relatively slide on each other, one of the slide parts being provided in a sealing face with a fluid circulation groove that communicates with a high-pressure fluid side via an inlet portion and an outlet portion and is separated from a low-pressure fluid side by a land portion, the other of the slide parts being circumferentially provided in a sealing face with a plurality of interference grooves for producing pressure variations in a fluid in the fluid circulation groove, the interference grooves communicating with the high-pressure fluid side, adjacent ones of the interference grooves being set to have different shapes.

According to this aspect, there is a pressure difference between the inlet portion and the outlet portion of the fluid circulation groove, which is constantly varying alternately, and the fluid in the fluid circulation groove repeats movements. Thus, even when a sealed fluid contains a deposit formation-causing substance, formation of deposits in the fluid circulation groove can be prevented, and the sealing function of the sealing faces can be maintained for a long period of time.

According to a second aspect of the present invention, in the slide component according to the first aspect, the adjacent interference grooves are set to have different depths.

According to this aspect, the pressure difference between the inlet portion and the outlet portion of the fluid circulation groove can be increased and produced reliably, and formation of deposits in the fluid circulation groove can be further prevented.

According to a third aspect of the present invention, in the slide component according to the first aspect, the adjacent interference grooves are set to have different planar-shape sizes.

According to this aspect, the pressure difference between the inlet portion and the outlet portion of the fluid circulation groove can be increased and produced reliably, and formation of deposits in the fluid circulation groove can be further prevented.

According to a fourth aspect of the present invention, in the slide component according to the first aspect, the interference grooves have an upstream edge and a downstream edge of different shapes, and the adjacent interference grooves are set to have a line-symmetric shape with respect to a radius line.

According to this aspect, the pressure difference between the inlet portion and the outlet portion of the fluid circulation groove can be increased further and produced more reliably, and formation of deposits in the fluid circulation groove can be further prevented.

According to a fifth aspect of the present invention, in the slide component according to any one of the first to fourth aspects, the one slide part is a stationary-side seal ring, the other slide part is a rotating-side seal ring, the rotating-side seal ring is formed larger in outside diameter and smaller in inside diameter than the stationary-side seal ring, and the interference grooves are arranged radially in positions to produce pressure variations in the fluid in the inlet portion and the outlet portion of the fluid circulation groove.

According to this aspect, since the interference grooves are formed in the sealing face of the rotating-side seal ring, a swirl flow accompanied by vortexes is actively formed, and the pressure difference between the inlet portion and the outlet portion of the fluid circulation groove can be further increased. Further, since a sealing face width depends on the stationary-side seal ring, variation in the sealing face width can be reduced.

According to a sixth aspect of the present invention, in the slide component according to any one of the first to fifth aspects, an end of the interference grooves on an inside-diameter side extends to a position in proximity to the inlet portion and the outlet portion of the fluid circulation groove.

According to this aspect, the pressure difference between the inlet portion and the outlet portion of the fluid circulation groove can be further increased.

According to a seventh aspect of the present invention, in the slide component according to any one of the first to fifth aspects, an end of the interference grooves on an inside-diameter side extends to a position radially overlapping the inlet portion and the outlet portion of the fluid circulation groove.

According to this aspect, pressure-varying effects by the interference grooves are exerted directly on the inlet portion and the outlet portion of the fluid circulation groove, and thus the pressure difference between the inlet portion and the outlet portion of the fluid circulation groove can be even further increased.

According to an eighth aspect of the present invention, in the slide component according to any one of the first to fifth aspects, the interference grooves include an interference groove extending at an end on an inside-diameter side to a position radially in proximity to the inlet portion and the outlet portion of the fluid circulation groove, and an interference groove extending at an end on an inside-diameter side to a position radially overlapping the inlet portion and the outlet portion of the fluid circulation groove.

According to this aspect, the pressure difference between the inlet portion and the outlet portion of the fluid circulation groove can be increased more and varied alternately.

Effect of the Invention

The present invention achieves the following outstanding effects.

(1) A pair of slide parts that relatively slide on each other is provided, one of the slide parts being provided in a sealing face with a fluid circulation groove that communicates with a high-pressure fluid side via an inlet portion and an outlet portion and is separated from a low-pressure fluid side by a land portion, the other of the slide parts being circumferentially provided in a sealing face with a plurality of interference grooves for producing pressure variations in a fluid in the fluid circulation groove, the interference grooves communicating with the high-pressure fluid side, adjacent ones of the interference grooves being set to have different shapes, whereby there is a pressure difference between the inlet portion and the outlet portion of the fluid circulation groove, which is constantly varying alternately, and the fluid in the fluid circulation groove repeats movements. Thus, even when a sealed fluid contains a deposit formation-causing substance, formation of deposits in the fluid circulation groove can be prevented, and the sealing function of the sealing faces can be maintained for a long period of time.

(2) The adjacent interference grooves are set to have different depths, whereby the pressure difference between the inlet portion and the outlet portion of the fluid circulation groove can be increased and produced reliably, and formation of deposits in the fluid circulation groove can be further prevented.

(3) The adjacent interference grooves are set to have different planar-shape sizes, whereby the pressure difference between the inlet portion and the outlet portion of the fluid circulation groove can be increased and produced reliably, and formation of deposits in the fluid circulation groove can be further prevented.

(4) The interference grooves have an upstream edge and a downstream edge of different shapes, and the adjacent interference grooves are set to have a line-symmetric shape with respect to a radius line, whereby the pressure difference between the inlet portion and the outlet portion of the fluid circulation groove can be increased further and produced more reliably, and formation of deposits in the fluid circulation groove can be further prevented.

(5) The one slide part is a stationary-side seal ring, and the other slide part is a rotating-side seal ring, the rotating-side seal ring is formed larger in outside diameter and smaller in inside diameter than the stationary-side seal ring, and the interference grooves are arranged radially in positions to produce pressure variations in the fluid in the inlet portion and the outlet portion of the fluid circulation groove, whereby since the interference grooves are formed in the sealing face of the rotating-side seal ring, a swirl flow accompanied by vortexes is actively formed, and the pressure difference between the inlet portion and the outlet portion of the fluid circulation groove can be further increased. Further, the sealing face width depends on the stationary-side seal ring, variation in the sealing face width can be reduced.

(6) An end of the interference grooves on the inside-diameter side extends to a position in proximity to the inlet portion and the outlet portion of the fluid circulation groove, whereby the pressure difference between the inlet portion and the outlet portion of the fluid circulation groove can be further increased.

(7) An end of the interference grooves on the inside-diameter side extends to a position radially overlapping the inlet portion and the outlet portion of the fluid circulation groove, whereby pressure-varying effects by the interference grooves are exerted directly on the inlet portion and the outlet portion of the fluid circulation groove, and thus the pressure difference between the inlet portion and the outlet portion of the fluid circulation groove can be even further increased.

(8) The interference grooves include an interference groove extending at an end on the inside-diameter side to a position radially in proximity to the inlet portion and the outlet portion of the fluid circulation groove, and an interference groove extending at an end on the inside-diameter side to a position radially overlapping the inlet portion and the outlet portion of the fluid circulation groove, whereby the pressure difference between the inlet portion and the outlet portion of the fluid circulation groove can be increased more and varied alternately.

DESCRIPTION OF EMBODIMENTS

Hereinafter, with reference to the drawings, embodiments for implementing the present invention will be described illustratively based on implementation examples. However, the sizes, materials, shapes, relative arrangements, and others of components described in the embodiments are not intended to limit the scope of the present invention only to them unless otherwise described explicitly.

First Embodiment

Figure 1:
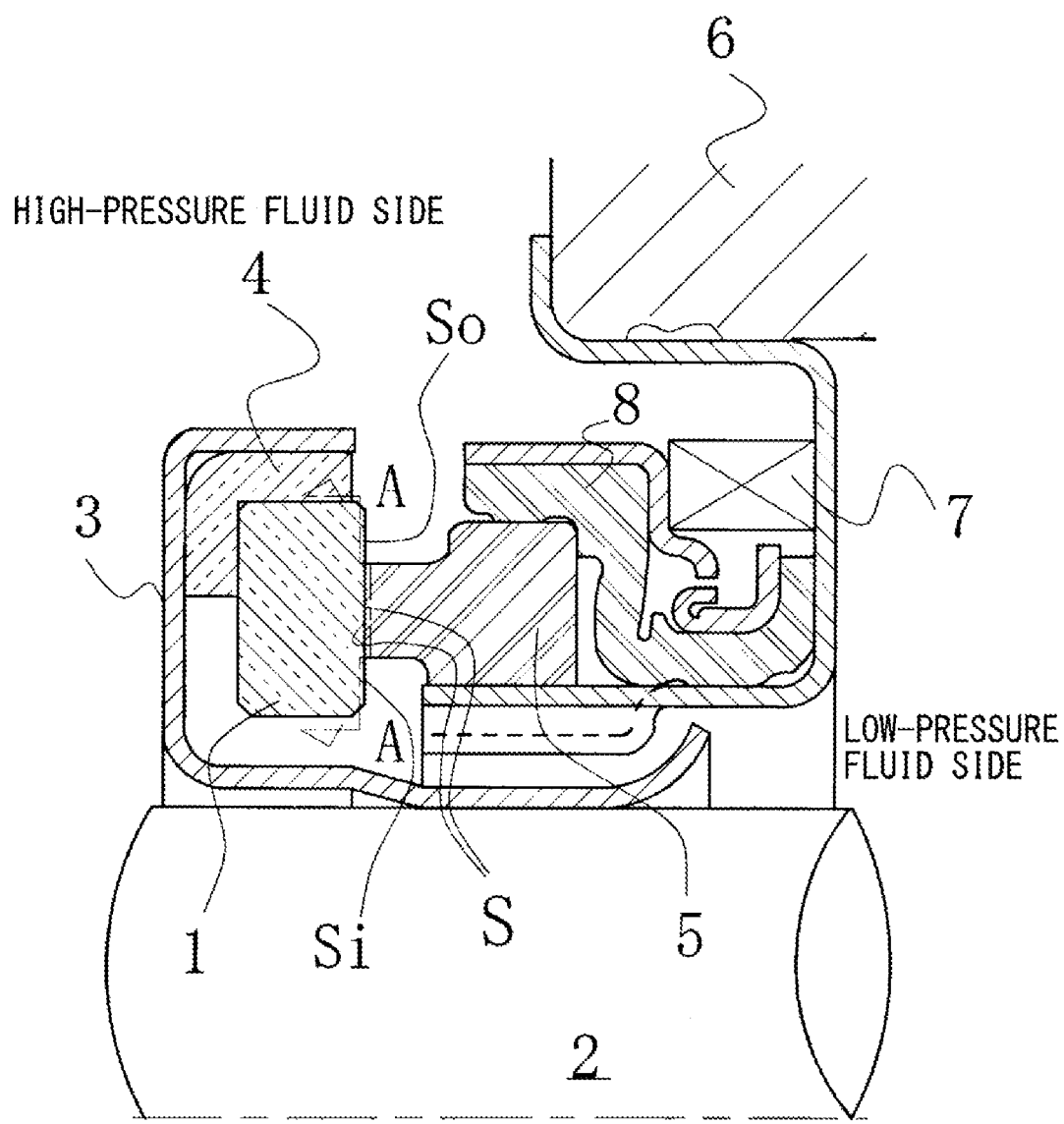
FIG. 1 is a vertical cross-sectional view showing an example of a mechanical seal according to a first embodiment of the present invention, showing an upper half thereof from the center of a rotating shaft.
Figure 2:
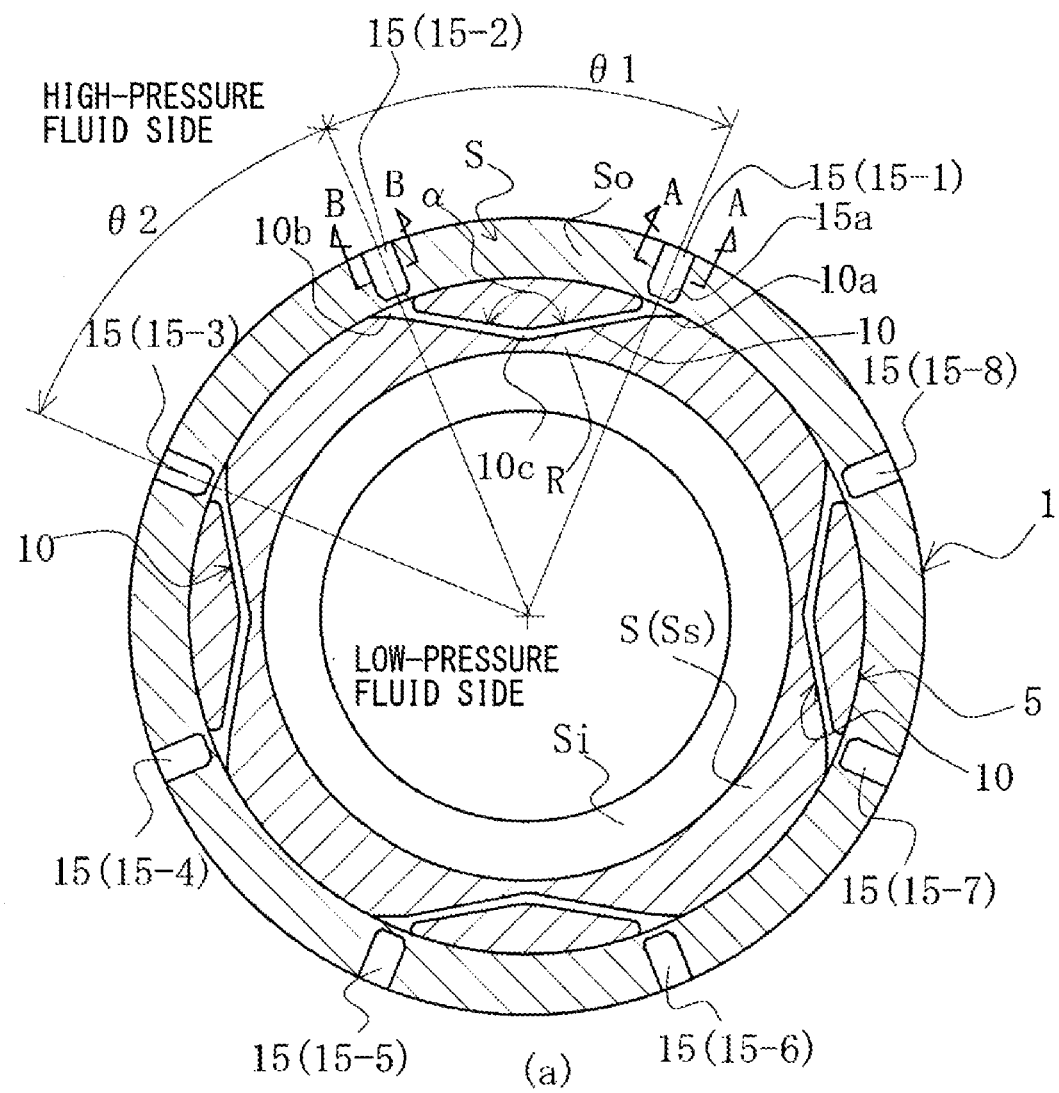
FIG. 2 is a cross-sectional view of sealing faces of slide parts taken along A-A in FIG. 1, cut at portions in proximity to the sealing faces for explaining the characteristics of the sealing faces, and showing the circumferences of the sealing faces.
Figure 2:
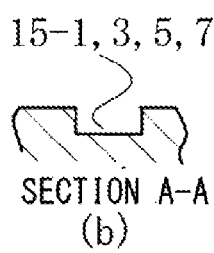
Figure 2:
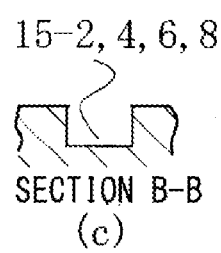

With reference to FIGS. 1 and 2, a slide component according to a first embodiment of the present invention will be described.

In the following embodiment, a mechanical seal, an example of the slide component, will be described as an example. The outer-peripheral side of slide parts constituting the mechanical seal is described as the high-pressure fluid side (sealed fluid side), and the inner-peripheral side as the low-pressure fluid side (atmosphere side). However, the present invention is not limited to this, and is applicable to a case where the high-pressure fluid side and the low-pressure fluid side are reversed.

FIG. 1 is a vertical cross-sectional view showing an example of the mechanical seal, which is an inside mechanical seal in a form of sealing a sealed fluid on the high-pressure fluid side trying to leak from the outer periphery of sealing faces toward the inner periphery. The mechanical seal is provided, on the side of a rotating shaft 2 to drive a rotor (e.g. a pump impeller not shown) on the high-pressure fluid side, with a rotating-side seal ring 1 in an annular shape, one of the slide parts, provided in a state of being rotatable with the rotating shaft 2 in an integrated manner via a sleeve 3 and a cup gasket 4, and at a housing 6, with a stationary-side seal ring 5 in an annular shape, the other of the slide parts, provided in a state of being non-rotatable and axially movable. By a coiled wave spring 7 and a bellows 8 axially biasing the stationary-side seal ring 5, the rotating-side seal ring 1 and the stationary-side seal ring 5 slide in close contact with each other on sealing portions S of sealing faces mirror-finished by lapping or the like. That is, the mechanical seal prevents the sealed fluid from flowing from the outer periphery of the rotating shaft 2 to the atmosphere side at the sealing portions S between the rotating-side seal ring 1 and the stationary-side seal ring 5.

In the mechanical seal, commonly, in order to accommodate a case where the rotation centers of the rotating-side seal ring 1 and the stationary-side seal ring 5 do not strictly agree, the sealing face width of one of them is made larger, that is, the outside diameter thereof is made larger and the inside diameter thereof is made smaller to form a sealing face margin So on the outside-diameter side and a sealing face margin Si on the inside-diameter side. In the present invention, portions on which the rotating-side seal ring 1 and the stationary-side seal ring 5 actually slide are referred to as sealing portions Ss, and a sealing face including sealing face margins is referred to as a sealing face S.

FIG. 1 shows a case where the outside diameter of the rotating-side seal ring 1 is larger than the outside diameter of the stationary-side seal ring 5, and the inside diameter of the rotating-side seal ring 1 is smaller than the inside diameter of the stationary-side seal ring 5, and the sealing face margins are formed on the rotating-side seal ring 1. The present invention is not limited to this, and is applicable to the opposite case as a matter of course.

In the case in FIG. 1, the sealing portion Ss and the sealing face S of the stationary-side seal ring 5 are the same.

FIG. 2(a) is a cross-sectional view along A-A in FIG. 1, in which the sealing faces S of the rotating-side seal ring 1 and the stationary-side seal ring 5 are shown by hatching.

In FIG. 2(a), it is assumed that the outside-diameter side of the sealing faces S is the high-pressure fluid side, and the inside-diameter side is the low-pressure fluid side, for example, the atmosphere side, and the rotating-side seal ring 1 rotates counterclockwise.

The sealing face S of the stationary-side seal ring 5 is circumferentially provided with four evenly spaced fluid circulation grooves 10 that communicate with the high-pressure fluid side and are separated from the low-pressure fluid side by smooth portions R of the sealing face (in the present invention, sometimes referred to as "land portions").

The fluid circulation grooves 10 are not limited in number to four. It is only necessary to provide at least one fluid circulation groove 10. The fluid circulation grooves 10 do not need to be evenly spaced.

The fluid circulation grooves 10 each include an inlet portion 10a for entry from the high-pressure fluid side, an outlet portion 10b for exit to the high-pressure fluid side, and a connection portion 10c circumferentially connecting the inlet portion 10a and the outlet portion 10b. The fluid circulation grooves 10 have the function of actively introducing the sealed fluid from the high-pressure fluid side into the sealing portion and discharging it in order to prevent concentration of a fluid containing a corrosion product or the like on the sealing portion Ss. The inlet portions 10a and the outlet portions 10b are formed with a wide mouth as shown in the drawing so as to facilitate taking the sealed fluid into the sealing portion and discharging it in accordance with the rotation of the opposite sealing face. On the other hand, the fluid circulation grooves 10 are separated from the low-pressure fluid side by the land portions R to reduce leakage.

In FIG. 2(a), the central angle θ1 between the inlet portion 10a and the outlet portion 10b of one of the fluid circulation grooves 10 is 45°, and the central angle θ2 between the outlet portion 10b and the inlet portion 10a of the adjacent fluid circulation grooves 10 is also set at 45°.

In this example, the inlet portions 10a and the outlet portions 10b are formed in a linear shape and form a substantially V shape, which is not particularly limiting. The interior angle α between the inlet portions 10a and the outlet portions 10b may be further increased or decreased. The inlet portions 10a and the outlet portions 10b may be formed in a curved shape (such as an arc shape) instead of in a linear shape. The width and depth of the fluid circulation grooves 10 are set optimally according to the pressure, type (viscosity), and others of the sealed fluid. An example of the depth is about 100 to 300 μm.

The fluid circulation grooves are not limited to the substantially V shape, and may be in a U shape, for example. It is essential only that the inlet portions and the outlet portions communicate with the high-pressure fluid side.

The sealing face S of the rotating-side seal ring 1 is provided with interference grooves 15 for producing pressure variations in the fluid in the fluid circulation grooves 10.

The shape of the interference grooves 15 is shown as a substantially rectangular shape in FIG. 2(a).

In FIG. 2(a), eight interference grooves 15-1 to 15-8 are provided circumferentially, and are preferably arranged circumferentially so that when the interference groove 15-1 is in a position facing the inlet portion 10a of one of the fluid circulation grooves 10, the downstream adjacent interference groove 15-2 is in a position facing the outlet portion 10b.

The interference grooves 15 communicate with the high-pressure fluid side, and are arranged radially in positions to produce pressure variations in the fluid in the inlet portions 10a and the outlet portions 10b of the fluid circulation grooves 10.

In the case in FIG. 2, the interference grooves 15 are provided in the sealing face margin So on the outside-diameter side, and their ends 15a on the inside-diameter side extend radially to positions in proximity to the inlet portions 10a and the outlet portions 10b of the fluid circulation grooves 10.

The word "proximity" mentioned here means radial proximity to the extent that vortexes formed in the interference grooves 15 or the like produce pressure variations in the fluid in the inlet portions 10a and the outlet portions 10b of the fluid circulation grooves 10.

In FIG. 2(a), the fluid circulation grooves 10 are formed to the outer periphery of the sealing face S (identical with the sealing portion Ss) of the stationary-side seal ring 5, and thus the ends 15a of the interference grooves 15 on the inside-diameter side extend radially to the positions in proximity to the outer periphery of the sealing face S of the stationary-side seal ring 5.

The eight interference grooves 15-1 to 15-8 are set so that adjacent ones of the interference grooves have different depths.

In FIG. 2(a), as shown in FIGS. 2(b) and 2(c), the depth of the interference grooves 15-1, 15-3, 15-5, and 15-7 in positions facing the inlet portions 10a of the fluid circulation grooves 10 is formed shallower than the depth of the interference grooves 15-2, 15-4, 15-6, and 15-8 in positions facing the outlet portions 10b of the fluid circulation grooves 10. On the contrary, the depth of the interference grooves 15-1, 15-3, 15-5, and 15-7 may be formed deeper than the depth of the interference grooves 15-2, 15-4, 15-6, and 15-8. Alternatively, the eight interference grooves 15-1 to 15-8 may have depths different from one another.

It is essential only to set the depths of the interference grooves 15 so that the depth of an interference groove in a position facing the inlet portion 10a of one of the fluid circulation grooves 10 is different from the depth of an interference groove in a position facing the outlet portion 10b of that fluid circulation groove 10.

In the case in FIG. 2(a), the four fluid circulation grooves 10 are evenly spaced. The central angle θ1 between the inlet portions 10a and the outlet portions 10b of the fluid circulation grooves 10 and the central angle θ2 between the outlet portions 10b and the inlet portions 10a of the fluid circulation grooves 10, 10 adjacent to each other are both set at 45°. On the other hand, the eight interference grooves 15 are evenly spaced, and the central angle θ between the interference grooves adjacent to each other is set at 45°.

When the rotating-side seal ring 1 rotates and, for example, the shallower interference grooves 15-1, 15-3, 15-5, and 15-7 are in positions facing the inlet portions 10a of the fluid circulation grooves 10, the deeper interference grooves 15-2, 15-4, 15-6, and 15-8 are in positions facing the outlet portions 10b of the fluid circulation grooves 10.

The fluid circulation grooves 10 do not need to be evenly spaced circumferentially, and are not limited in number to four. The central angle θ1 between the inlet portions 10a and the outlet portions 10b does not need to be 45°. Further, the interference grooves 15 do not need to be evenly spaced circumferentially, and are not limited in number to eight. It is essential only that when the rotating-side seal ring 1 rotates, the interference grooves of different depths are in positions facing the inlet portion 10a and the outlet portion 10b of each of the fluid circulation grooves 10.

When the rotating-side seal ring 1 is rotated, vortexes are formed in the vicinities of the interference grooves 15, and the interference grooves 15 accompanied by the vortexes move circumferentially. When the interference grooves 15 reach positions facing the inlet portion 10a and the outlet portion 10b of one of the fluid circulation grooves 10, pressures of the fluid in the inlet portion 10a and the outlet portion 10b increase. The degree of pressure increase depends on the groove depth.

In a state shown in FIG. 2(a), the interference grooves 15-1, 15-3, 15-5, and 15-7 of shallow grooves are in positions facing the inlet portions 10a, and the interference grooves 15-2, 15-4, 15-6, and 15-8 of deep grooves are in positions facing the outlet portions 10b. Then, when the rotating-side seal ring 1 is rotated by θ2, the interference grooves 15-1, 15-3, 15-5, and 15-7 of shallow grooves are in positions facing the outlet portions 10b, and the interference grooves 15-2, 15-4, 15-6, and 15-8 of deep grooves are in positions facing the inlet portions 10a.

Thus, when the rotating-side seal ring 1 is rotated, the interference grooves 15 consecutively produce pressure variations in the inlet portions 10a and the outlet portions 10b, and there is a pressure difference between the inlet portions 10a and the outlet portions 10b, which is constantly varying alternately.

When there is a pressure difference between the inlet portions 10a and the outlet portions 10b, which is constantly varying alternately, the fluid in the fluid circulation grooves 10 repeats movements. Thus, even when the sealed fluid contains a deposit formation-causing substance, formation of deposits in the fluid circulation grooves 10 is prevented.

The first embodiment achieves the following prominent effects.

(1) The fluid circulation grooves 10 communicating with the high-pressure fluid side via the inlet portions 10a and the outlet portions 10b and separated from the low-pressure fluid side by the land portions R are provided in the sealing face of the stationary-side seal ring 5, and the interference grooves 15 for producing pressure variations in the fluid in the fluid circulation grooves 10 are provided in the sealing face of the rotating-side seal ring 1. Thus there is a pressure difference between the inlet portions 10a and the outlet portions 10b of the fluid circulation grooves 10, which is constantly varying alternately, and the fluid in the fluid circulation grooves repeats movements. Thus, even when the sealed fluid contains a deposit formation-causing substance, formation of deposits in the fluid circulation grooves 10 can be prevented, and the sealing function of the sealing faces can be maintained for a long period of time. Further, since the sealing face width depends on the stationary-side seal ring 5, variation in the sealing face width can be reduced.

(2) The plurality of interference grooves 15 is provided circumferentially. Even when one of the interference grooves 15 is in a position facing the inlet portion 10a of one of the fluid circulation grooves 10 while one of the other interference grooves 15 is in a position facing the outlet portion 10b of the fluid circulation groove 10, since the interference grooves have different depths, the plurality of interference grooves 15 allows the pressure difference between the inlet portions 10a and the outlet portions 10b of the fluid circulation grooves 10 to be increased and reliably produced, and formation of deposits in the fluid circulation grooves 10 can be further prevented.

(3) Since the ends 15a of the interference grooves 15 on the inside-diameter side extend to positions radially in proximity to the inlet portions 10a and the outlet portions 10b of the fluid circulation grooves 10, the pressure difference between the inlet portions 10a and the outlet portions 10b of the fluid circulation grooves 10 can be further increased.

Second Embodiment

Figure 3:
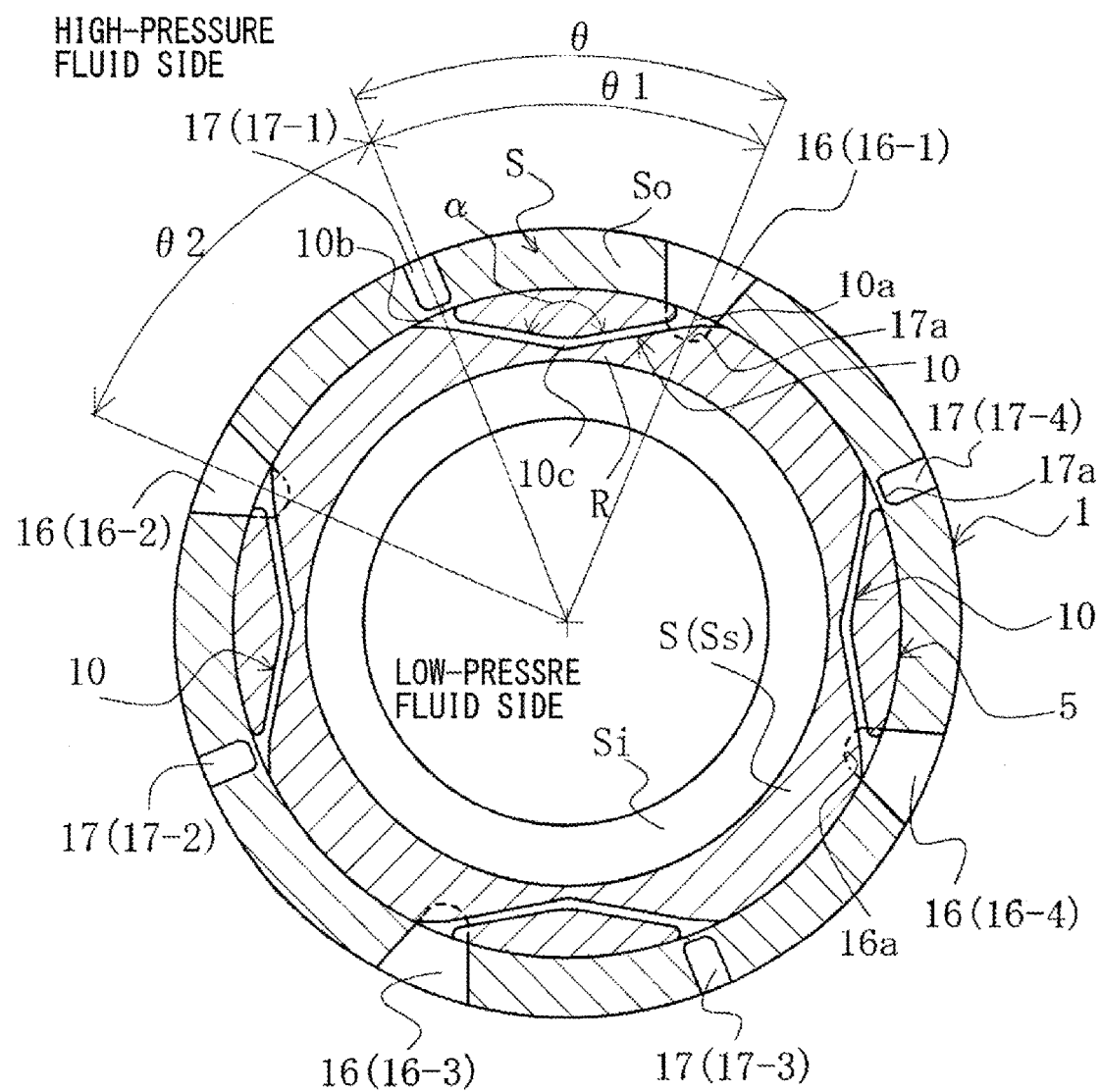
FIG. 3 shows sealing faces of slide parts according to a second embodiment of the present invention in the same manner as FIG. 2.

With reference to FIG. 3, a slide component according to a second embodiment of the present invention will be described.

The second embodiment is different from the first embodiment in that interference grooves of different planar-shape sizes are arranged, but is otherwise identical with the first embodiment. In FIG. 3, the same reference numerals as in FIG. 2 denote the same members, and redundant descriptions will be omitted.

In FIG. 3, four interference grooves 16 of a larger planar shape and four interference grooves 17 of a smaller planar shape are provided circumferentially alternately.

The plurality of interference grooves 16, 17 is preferably arranged so that, for example, when the interference grooves 16 of the larger planar shape are in positions facing inlet portions 10a of the fluid circulation grooves 10, the interference grooves 17 of the smaller planar shape are in positions facing outlet portions 10b of the fluid circulation grooves 10.

In the case in FIG. 3, four fluid circulation grooves 10 are evenly spaced. The central angle θ1 between the inlet portions 10a and the outlet portions 10b of the fluid circulation grooves 10 and the central angle θ2 between the outlet portions 10b and the inlet portions 10a of the fluid circulation grooves 10, 10 adjacent to each other are both set at 45°. On the other hand, the eight interference grooves 16, 17 are evenly spaced, and the central angle θ between the interference grooves adjacent to each other is set at 45°.

When a rotating-side seal ring 1 rotates and, for example, the interference grooves 16 of the larger planar shape are in positions facing the inlet portions 10a of the fluid circulation grooves 10, the interference grooves 17 of the smaller planar shape are in positions facing the outlet portions 10b of the fluid circulation grooves 10.

The fluid circulation grooves 10 do not need to be evenly spaced circumferentially, and are not limited in number to four. The central angle θ1 between the inlet portions 10a and the outlet portions 10b does not need to be 45°. Further, the interference grooves 16, 17 do not need to be evenly spaced circumferentially, and are not limited in number to eight. It is essential only that when the rotating-side seal ring 1 rotates, the interference grooves of different planar-shape sizes are in positions facing the inlet portion 10a and the outlet portion 10b of each of the fluid circulation grooves 10.

The interference grooves 16 of the larger planar shape are larger in circumferential width and radial length than the interference grooves 17 of the smaller planar shape, form a substantially trapezoidal shape, and are arranged so that the base is located on the outside-diameter side. The interference grooves 16 communicate with the high-pressure fluid side, and ends 16a of the interference grooves 16 on the inside-diameter side extend to positions radially overlapping the inlet portions 10a and the outlet portions 10b of the fluid circulation grooves 10 as shown by broken lines. That is, the interference grooves 16 are formed to extend radially beyond a sealing face margin So on the outside-diameter side to a sealing portion Ss of the rotating-side seal ring 1.

The interference grooves 17 of the smaller planar shape are smaller in circumferential width and radial length than the interference grooves 16 of the larger planar shape, and have a substantially rectangular shape. The interference grooves 17 communicate with the high-pressure fluid side, and are arranged radially in positions to produce pressure variations in the fluid in the inlet portions 10a and the outlet portions 10b of the fluid circulation grooves 10.

In the case in FIG. 3, the interference grooves 17 are provided in the sealing face margin So on the outside-diameter side, and their ends 17a on the inside-diameter side extend radially to positions in proximity to the inlet portions 10a and the outlet portions 10b of the fluid circulation grooves 10.

The word "proximity" mentioned here means radial proximity to the extent that vortexes formed in the interference grooves 17 or the like produce pressure variations in the fluid in the inlet portions 10a and the outlet portions 10b of the fluid circulation grooves 10.

Produced pressure increase differs, depending on the planar-shape sizes of the interference grooves 16, 17, and also the effect of pressure on the fluid in the inlet portions 10a and the outlet portions 10b differs, depending on the radial positional relationships between the interference grooves 16, 17 and the inlet portions 10a and the outlet portions 10b of the fluid circulation grooves 10.

In the second embodiment, when the rotating-side seal ring 1 rotates, the interference grooves of different planar-shape sizes are in positions facing the inlet portion 10a and the outlet portion 10b of each of the fluid circulation grooves 10, the interference grooves 17 of the smaller planar shape extend, at the ends 17a on the inside-diameter side, to the positions radially in proximity to the inlet portions 10a and the outlet portions 10b of the fluid circulation grooves 10, and the interference grooves 16 of the larger planar shape extend, at the ends 16a on the inside-diameter side, to the positions radially overlapping the inlet portions 10a and the outlet portions 10b of the fluid circulation grooves 10, so that the pressure difference between the inlet portions 10a and the outlet portions 10b of the fluid circulation grooves 10 can be increased more and varied alternately, and formation of deposits in the fluid circulation grooves 10 can be further prevented.

Third Embodiment

Figure 4:
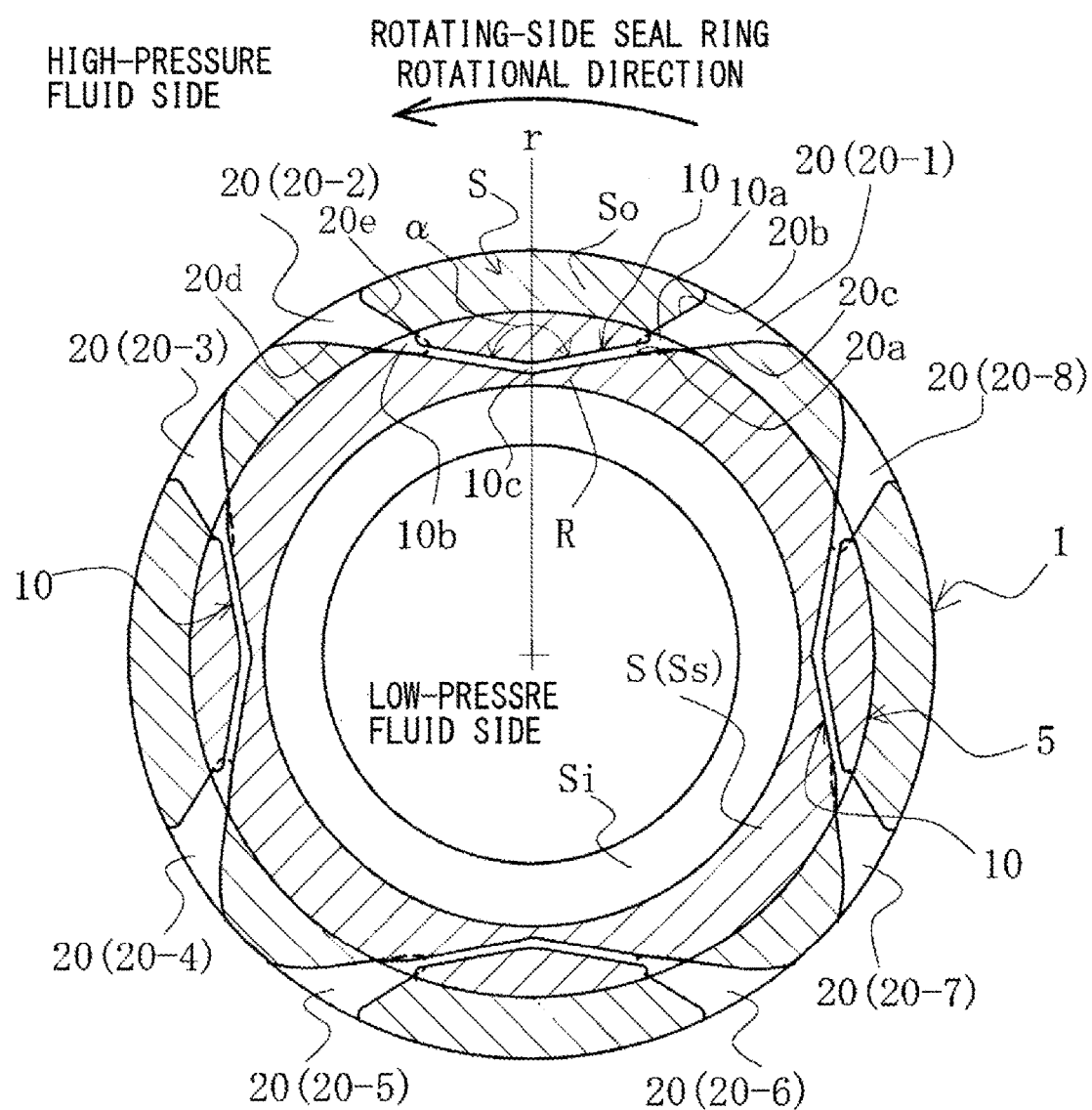
FIG. 4 shows sealing faces of slide parts according to a third embodiment of the present invention in the same manner as FIG. 2.

With reference to FIG. 4, a slide component according to a third embodiment of the present invention will be described.

The third embodiment is different from the second embodiment shown in FIG. 3 in the planar shape of interference grooves, but is otherwise identical with the second embodiment.

In FIG. 4, the same reference numerals as in FIG. 3 denote the same members, and redundant descriptions will be omitted.

In FIG. 4, a sealing face S of a stationary-side seal ring 5 is provided with four evenly-spaced fluid circulation grooves 10 in a substantially V shape.

On the other hand, a sealing face S of a rotating-side seal ring 1 is circumferentially provided with eight interference grooves 20. The interference grooves 20 are formed circumferentially in a shape to face inlet portions 10a and outlet portions 10b of the fluid circulation grooves 10, and to conform to extensions of the inlet portions 10a and the outlet portions 10b on the outside-diameter side.

The interference grooves 20 communicate with the high-pressure fluid side, and ends 20a of the interference grooves 20 on the inside-diameter side extend to positions radially overlapping the inlet portions 10a and the outlet portions 10b of the fluid circulation grooves 10 as shown by broken lines. That is, the interference grooves 20 are formed to extend radially beyond a sealing face margin So on the outside-diameter side to a sealing portion Ss of the rotating-side seal ring 1.

The interference grooves 20 have an upstream edge and a downstream edge of different shapes.

Adjacent ones of the interference grooves 20 are set to have a line-symmetric shape with respect to a radius line r.

In FIG. 4, interference grooves 20-1, 20-3, 20-5, and 20-7 are formed in a shape conforming to extensions of the inlet portions 10a on the outside-diameter side, and interference grooves 20-2, 20-4, 20-6, and 20-8 are formed in a shape conforming to extensions of the outlet portions 10b on the outside-diameter side. That is, the interference grooves 20-1, 20-3, 20-5, and 20-7 and the interference grooves 20-2, 20-4, 20-6, and 20-8 adjacent to each other have reversed shapes relative to the radius line r.

When the rotating-side seal ring 1 is rotated counterclockwise, at the interference grooves 20-1, 20-3, 20-5, and 20-7 formed in the shape conforming to the extensions of the inlet portions 10a on the outside-diameter side, an upstream edge 20b extends upstream for a relatively short distance from the end 20a on the inside-diameter side to an outside-diameter end in a smooth arc-shaped curve. A downstream edge 20c extends downstream for a relatively long distance from the end 20a on the inside-diameter side to an outside-diameter end in a smooth arc-shaped curve.

On the other hand, at the interference grooves 20-2, 20-4, 20-6, and 20-8 formed in the shape conforming to the extensions of the outlet portions 10b on the outside-diameter side, an upstream edge 20d extends upstream for a relatively long distance from the end 20a on the inside-diameter side to an outside-diameter end in a smooth arc-shaped curve. A downstream edge 20e extends downstream for a relatively short distance from the end 20a on the inside-diameter side to an outside-diameter end in a smooth arc-shaped curve.

When the rotating-side seal ring 1 is rotated counterclockwise, negative pressure is generated in the vicinities of the upstream edges of the interference grooves 20, and positive pressure is generated in the vicinities of the downstream edges.

The interference grooves 20-1, 20-3, 20-5, and 20-7 formed in the shape conforming to the extensions of the inlet portions 10a on the outside-diameter side are under positive pressure since the upstream edges 20b are shorter than the downstream edges 20c. The interference grooves 20-2, 20-4, 20-6, and 20-8 formed in the shape conforming to the extensions of the outlet portions 10b on the outside-diameter side are under negative pressure since the upstream edges 20d are longer than the downstream edges 20e.

Now, when the rotating-side seal ring 1 is rotated counterclockwise, the inlet portions 10a are under positive pressure, and the outlet portions 10b are under negative pressure. At that time, the interference grooves 20 pass over the inlet portions 10a and the outlet portions 10b of the fluid circulation grooves 10. Therefore, the effects of the interference grooves 20 are directly conveyed to the inlet portions 10a and the outlet portions 10b. At the inlet portions 10a and the outlet portions 10b of the fluid circulation grooves 10, when the interference grooves 20 pass, a pressure difference develops, and after the passage, a phenomenon that the pressure difference is disappearing occurs, which constantly occurs.

As described above, the development and disappearance of the pressure difference occur between the inlet portions 10a and the outlet portions 10b, which constantly occurs, and thus pressures in the inlet portions 10a and the outlet portions 10b constantly vary. Therefore, formation of deposits in the fluid circulation grooves 10 is reliably prevented.

In the third embodiment, since the upstream edges 20b, 20d and the downstream edges 20c, 20e of the interference grooves 20 have different shapes, pressures in the inlet portions 10a and the outlet portions 10b of the fluid circulation grooves 10 constantly vary. The ends 20a of the interference grooves 20 on the inside-diameter side extend to positions radially overlapping the inlet portions 10a and the outlet portions 10b of the fluid circulation grooves 10, whereby the pressure-varying effects by the interference grooves 20 are directly exerted on the inlet portions 10a and the outlet portions 10b of the fluid circulation grooves 10. Thus, a prominent effect of reliably preventing formation of deposits in the fluid circulation grooves 10 is achieved.

Although the embodiments of the present invention have been described above with reference to the drawings, a detailed configuration is not limited to the embodiments. Any change and addition made without departing from the scope of the present invention are also included in the present invention.

For example, although the embodiments have been described with an example in which a slide part is used for one of a pair of a rotating-side seal ring and a stationary-side seal ring in a mechanical seal device, it may be used as a bearing slide part that slides on a rotating shaft while sealing a lubricating oil in one of the axial directions of a cylindrical sealing face.

Further, for example, although the embodiments have been described with a case where a high-pressure sealed fluid is present on the outer-peripheral side, the embodiments may be applied to a case where a high-pressure fluid is on the inner-peripheral side.

Further, for example, although the embodiments have been described with a case where fluid circulation grooves are provided in a stationary-side seal ring of a mechanical seal constituting a slide component, and interference grooves are provided in a rotating-side seal ring, on the contrary, fluid circulation grooves may be provided in a rotating-side seal ring, and interference grooves in a stationary-side seal ring.

Further, for example, although the embodiments have been described with a case where the plurality of fluid circulation grooves 10 is spaced evenly, it is only necessary to provide at least one fluid circulation groove 10. When a plurality of fluid circulation grooves 10 is provided, they do not need to be evenly spaced. Further, although the embodiments have been described with a case where the plurality of interference grooves 15, 16, 17, and 20 are evenly spaced, it is only necessary to provide at least two interference grooves, and they do not need to be evenly spaced.

REFERENCE SIGNS LIST 1 rotating-side seal ring
2 rotating shaft
3 sleeve
4 cup gasket
5 stationary-side seal ring
6 housing 7 coiled wave spring
8 bellows
10 fluid circulation groove
10a inlet portion
10b outlet portion
10c connection portion
15 interference groove
15a end of the interference groove on the inside-diameter side
16, 17 interference groove
16a, 17a end of the interference groove on the inside-diameter side
20 interference groove
20a end of the interference groove on the inside-diameter side
20b, 20d upstream edge of the interference groove
20c, 20e downstream edge of the interference groove
R land portion
S sealing face
Ss sealing portion

The invention claimed is:

1. A slide component comprising a pair of slide parts that relatively slide on each other, one of the slide parts being provided in a sealing face with a fluid circulation groove that communicates with a high-pressure fluid side via an inlet portion and an outlet portion and is separated from a low-pressure fluid side by a land portion, the other of the slide parts being circumferentially provided in a sealing face with a plurality of interference grooves for producing pressure variations in a fluid in the fluid circulation groove, the interference grooves communicating with the high-pressure fluid side, adjacent ones of the interference grooves being set to have different shapes, wherein the one of the slide parts is a stationary-side seal ring, the other of the slide parts is a rotating-side seal ring, the rotating-side seal ring has a sealing face margin having an outside diameter made larger and an inside diameter made smaller than an outside diameter and an inside diameter of the stationary-side seal ring, respectively, and the interference grooves are provided in the sealing face margin, wherein an end on an inside-diameter side of at least one of the adjacent interference grooves is located outwardly away from but in proximity to the outside diameter of the stationary-side seal ring in a radial direction in a manner being in proximity to the inlet portion and the outlet portion of the fluid circulation groove when the rotating-side seal ring rotates, and when one of the adjacent interference grooves faces the inlet portion of the fluid circulation groove in a radial direction, the other of the adjacent interference grooves different in shape from the one of the adjacent interference grooves faces the outlet portion of the fluid circulation groove in a radial direction.

2. The slide component according to claim 1, wherein the adjacent interference grooves are set to have different depths.

3. The slide component according to claim 1, wherein the adjacent interference grooves are set to have different planar-shape sizes.

4. The slide component according to claim 1, wherein the interference grooves have an upstream edge and a downstream edge of different shapes, and the adjacent interference grooves are set to have a line-symmetric shape with respect to a radius line.

5. The slide component according to claim 1, wherein an end on the inside-diameter side of the other of the adjacent interference grooves extends to a position radially overlapping the inlet portion and the outlet portion of the fluid circulation groove as viewed in an axial direction.

6. The slide component according to claim 2, wherein an end on the inside-diameter side of the other of the adjacent interference grooves extends to a position radially overlapping the inlet portion and the outlet portion of the fluid circulation groove as viewed in an axial direction.

7. The slide component according to claim 3, wherein an end on the inside-diameter side of the other of the adjacent interference grooves extends to a position radially overlapping the inlet portion and the outlet portion of the fluid circulation groove as viewed in an axial direction.

8. The slide component according to claim 4, wherein an end on the inside-diameter side of the other of the adjacent interference grooves extends to a position radially overlapping the inlet portion and the outlet portion of the fluid circulation groove as viewed in an axial direction.

* * * * *

UNITED STATES PATENT AND TRADEMARK OFFICE
CERTIFICATE OF CORRECTION

PATENT NO.        : 10,344,867 B2
APPLICATION NO.   : 15/505571
DATED             : July 9, 2019
INVENTOR(S)       : Itadani et al.

Page 1 of 1

It is certified that error appears in the above-identified patent and that said Letters Patent is hereby corrected as shown below:

On the Title Page

Item: (72), Inventors at the second line, please delete "Sungawa" and insert therefor --Sunagawa--

Signed and Sealed this
Twenty-fourth Day of September, 2019

Andrei Iancu
*Director of the United States Patent and Trademark Office*